United States Patent [19]

Kretas et al.

[11] 4,260,493
[45] Apr. 7, 1981

[54] SOLUTION WASTE TREATMENT

[75] Inventors: George A. Kretas, Everett; Irving R. Ireland, Newton Lower Falls, both of Mass.

[73] Assignee: Shipley Company, Inc., Newton, Mass.

[21] Appl. No.: 40,954

[22] Filed: May 21, 1979

[51] Int. Cl.³ .............................................. C02F 1/52
[52] U.S. Cl. ..................................... 210/714; 75/109; 210/719; 210/753; 210/756; 210/912
[58] Field of Search ............... 75/108, 109; 210/42 R, 210/45, 46, 47, 49, 50-53, 59, 60, 62, 63 R, 36, 38 B; 252/455 R; 447; 423/34, 140

[56] References Cited

U.S. PATENT DOCUMENTS

| 3,494,760 | 2/1970 | Ginder | 75/108 |
| 3,666,447 | 5/1972 | Saubestre | 75/108 |
| 3,767,572 | 10/1973 | Bober et al. | 210/62 |
| 3,770,630 | 11/1973 | Kamperman | 210/59 |
| 3,802,910 | 4/1974 | Gerow et al. | 210/59 |
| 3,957,506 | 5/1976 | Lundguist et al. | 75/109 |
| 4,072,605 | 2/1978 | Thelander | 210/62 |
| 4,159,309 | 6/1979 | Faul et al. | 75/109 |
| 4,172,785 | 10/1979 | Knorre et al. | 210/50 |

FOREIGN PATENT DOCUMENTS 1267586 3/1972 United Kingdom ................ 210/50

Primary Examiner—Peter A. Hruskoci
Attorney, Agent, or Firm—Dike, Bronstein, Roberts, Cushman & Pfund

[57] ABSTRACT

A process is provided for the waste treatment of metal plating solutions One embodiment of the process comprises removal of the metal values contained in solution and inactivation or destruction of the complexing agent's ability to complex heavy metals. A second embodiment comprises inactivation or destruction of the complexing agent as a first step, formation of a sludge if not formed by inactivation of the complexing agent and sludge removal. Either embodiment permits direct discharge of spent plating solutions into the environment without violation of federal or municipal regulation.

14 Claims, 2 Drawing Figures

SOLUTION WASTE TREATMENT

BACKGROUND OF THE INVENTION

1. Introduction

This invention is directed to a process for the waste treatment of metal plating solutions containing active complexing agents.

2. Description of the Prior Art

Solutions capable of plating metal are well known in the art. The most commonly used metal plating solutions comprise electrolytic solutions and electroless solutions—i.e., those capable of plating metal without the need for electricity.

The most frequently used electroless solutions for plating metal comprise copper and nickel plating solutions. Such solutions generally comprise four major ingredients dissolved in water. These ingredients include (1) a source of the metal plating ions, (2) one or more complexing agents capable of maintaining said metal ions in solution, (3) a reducing agent capable of reducing said metal ions to metallic form in the presence of a catalytic surface, and (4) a pH adjustor to maintain solution pH within a desired range. Other conventional additives include stabilizers to prevent the solution from undergoing spontaneous decomposition, brighteners to improve appearance and exaltants or rate retardants to regulate plating rate.

Electroplating solutions are used to plate a variety of metals and bear some resemblance to electroless plating solutions. However, they typically do not require reducing agents for plating and many do not require complexing agents. Many of those solutions that do use complexing agents are intended for use at a alkaline pH. Electroplating solutions also contain other additives such as brighteners and grain refiners, though those specific materials used to perform such functions in electroless baths are not necessarily useful for the same function in an electrolytic bath.

The major ingredients of plating solutions are well known. The metal ions for an electroless solution are derived from a salt such as a sulphate or chloride. A common source of a metal for an electroplating solution is a sulfamate. The reducing agent for electroless copper plating solutions is generally formaldehyde and for electroless nickel plating solutions, sodium hypophosphite. Other reducing agents such as hydrazine and various boron compounds are also used, but less frequently.

There are a wide variety of complexing agents known for metal plating solutions. These include various amines such as primary, secondary, tertiary and quaternary amines, various carboxylic acids and various amino acids. Illustrative examples of complexing agents used in such solutions comprise Rochelle salts (a double salt of sodium and potassium tartrate), pentahydroxypropyl diethylene triamine and ethylene diamine tetracetic acid.

Representative electroless nickel and copper plating solutions are disclosed in U.S. Pat. Nos. 3,329,512; 3,383,224; 3,650,777; 3,674,516; 3,915,716; and 4,036,651, all of which disclose the compositions of known plating solutions. The contents of these patents are incorporated herein by reference. Representative electrolytic metal plating solutions are disclosed in the *Metal Finishing Guidebook and Directory*, Metals and Plastics Publications, Inc., Hackensack, N.J. 1976, pp. 177 to 338. The contents of this portion of the handbook are also incorporated herein by reference.

It is known in the art that when metal plating solutions are used, the content of various components of the solution are consumed. Electroless metal plating solutions deposit metal by contact of the complexed metal in solution with a catalytic surface in the presence of a reducing agent. As metal plating proceeds, the concentration of both the metal in solution and the reducing agent is reduced, the metal by plate-out onto a substrate and the reducing agent as a consequence of consumption in accordance with the chemical reaction controlling plating.

It is also known that metal plating solutions can be replenished by addition or replenishment of consumed ingredients. Thus, when approximately from twenty to forty percent of the metal originally contained in an electroless solution is consumed, it is conventional to add a replenisher formulation consisting primarily of the metal salt and reducing agent and also minor quantities of other ingredients lost by drag-out or otherwise. Though the useful life of a plating solution may be prolonged by replenishment, eventually the solution becomes unsatisfactory and disposal is necessary. In addition, growth of metal plating solutions as a consequence of replenishment with replenisher in solution form also requires the disposal of excess solution. Further, rinse waters for plated parts build up metal values and these rinse waters also must be dumped. Frequently, for disposal, the metal plating solution, the growth resulting from replenishment and the rinse waters are combined for both waste treatment and disposal. Consequently, for purposes of definition, the term plating solution is defined broadly to include solutions containing dissolved metals and active complexing agent whether derived from the plating solution, rinse waters or growth or any combination of solutions resulting from a plating line.

The composition of several typical metal plating solutions, at initial make-up and when spent, are set forth below for purposes of illustration. The concentrations of the components of the spent solution are given as a range because they can vary within very broad limits dependent upon the source of the solution as discussed above. Hence, the ranges given should be viewed as illustrative only and should not be interpreted as limitations to the scope of the invention.

EXAMPLE 1* (ELECTROLESS COPPER SOLUTION)

| Ingredient | Initial | Spent |
|---|---|---|
| Copper sulfate pentahydrate (gm) | 10 | 2–10 |
| Paraformaldehyde (gm) | 9.3 | 2–10 |
| Sodium Hydroxide (gm) | 25 | 5–25 |
| Pentahydroxypropyl diethylene triamine (gm) | 20 | 4–20 |
| Water | To one liter | |

*Example 1, U.S. Pat. No. 3,383,224

EXAMPLE 2* (ELECTROLESS NICKEL SOLUTION)

| Ingredient | Initial | Spent |
|---|---|---|
| Nickel sulfate (gm) | 20 | 2–20 |
| Sodium Hypophosphite (gm) | 30 | 3–30 |
| Hydroxy acetic acid (ml) | 33 | 3–30 |

-continued

| | |
|---|---|
| Water | To one liter |

*Example 44, U.S. Pat. No. 3,977,884

EXAMPLE 3* (ELECTROLYTIC PALLADIUM SOLUTION—ALKALINE)

| Ingredient | Initial | Spent |
|---|---|---|
| Palladium (as diamino nitrite dissolved in dilute ammonia) (gm) | 15 | 3–15 |
| Ammonium nitrate (oz) | 12 | 2–12 |
| Sodium nitrite (oz) | 1.5 | 0.3–1.5 |
| Ammonium hydroxide to pH | 9 | 7–10 |
| Water | | To one gallon |

*Page 286, *Metal Finishing Guidebook*, supra

From the above formulations, it can be seen that the spent solutions may contain substantial quantities of metal and complexing agents, even though ready for disposal. These materials present a problem because discharging dissolved metals directly into effluent streams, other than in minute quantities, is prohibited by state and federal regulations.

Methods are known for reducing the dissolved metal content of spent solutions to acceptable levels, however, the complexing agent in the spent solution is intact following treatment to remove metal values. Hence, the complexing agent in the solution is able to complex with any of a variety of metals that it comes into contact with as it is pumped to the point of discharge. These metals may come from reactor vessels, piping leading to a discharge point, residues of other materials deposited in said reactors or piping or from settling ponds where frequently, all waste solutions are pumped to permit solids to settle before discharge. The result is that even following treatment to remove dissolved metals, the solution cannot be discharged because the metal content of the solution is prohibitively high as a consequence of the active complexing agent dissolving metal residues.

SUMMARY OF THE INVENTION

In accordance with the subject invention, a process is provided for the waste treatment of a plating solution containing dissolved metals and complexing agents whereby the solution can be discharged to the environment without violating most, if not all, federal, state and municipal regulations. Broadly stated, in one embodiment, the process comprises the steps of reducing the dissolved metal content of the plating solution to acceptable levels followed by inactivation or destruction of the complexing agent within the solution so that it is no longer capable of complexing with metals. In another embodiment, the complexing agent is first inactivated or destroyed, the dissolved metals are insolubilized, usually in the form of a sludge, and the sludge is removed. In either method, the complexing agent is no longer capable of complexing with metal values and the solution can be discharged directly into sewer lines, septic systems or the like.

The preferred method in accordance with the invention comprises removing the metal content by contact of the plating solution with a dispersant of high surface area that has been treated with a catalytic material followed by hypochlorination of the complexing agent to render the same inactive.

DESCRIPTION OF THE PREFERRED EMBODIMENTS

Figure 1:
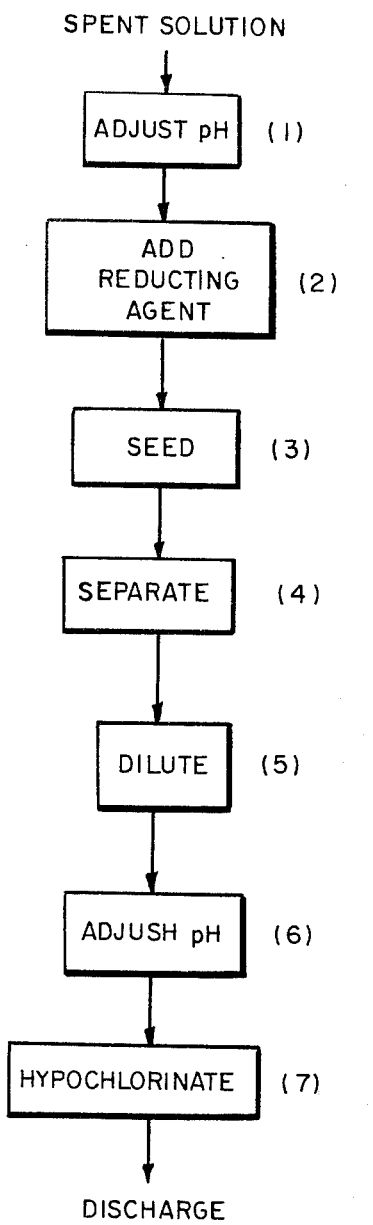
FIG. 1 represents a flow chart of the currently preferred method for performing the process of the subject invention.

From the formulations set forth above for typical plating solutions (Examples 1 to 3), it can be seen that the plating solutions to be waste treated may contain substantial quantities of dissolved metals and, frequently, the concentration of the complexing agent is only slightly reduced from its initial concentration since it is not consumed by the plating reaction. In general, as discussed above, the dissolved metal content can vary within very wide limits dependent upon the source of the specific solution treated. For example, rinse waters are frequently mixed with a spent plating solution prior to waste treatment. Solutions so mixed are within the scope of this invention. Solutions mixed with rinse waters would have a lower content of dissolved metal and complexing agent than solutions composed of excess growth or solutions no longer usable because their plating properties have become unpredictable. For purposes of illustration only, both the metal content of a conventional spent solution to be treated in accordance with this invention and the complexing agent may vary between 0.1 and 50 grams per liter and more typically, between 2 and 25 grams per liter. Consequently, a successful waste treatment process permitting direct disposal of the solution to the environment should comprise the steps of removing the dissolved metal from the solution and inactivation of the complexing agents.

In accordance with the preferred embodiment of the invention, the first step in the treatment of a spent plating solution comprises removal of dissolved metal contained in solution. Numerous methods are known for accomplishing this.

One method practiced in the art for the treatment of solutions containing a reducing agent comprises contact of the solution with a material that causes the solution to undergo spontaneous decomposition resulting in the precipitation of the metal (referred to in the art as "triggering" the solution). This method comprises loading the spent solution with a material catalytic to the plating reaction. A convenient method for accomplishing this is by addition of a palladium catalyst to the plating solution. Palladium catalysts are used to render a noncatalytic surface catalytic to electroless metal plating. One such catalyst is sold under the tradename CATALYST 6F and comprises an aqueous, highly acidic colloid of palladium and stannous tin in an amount sufficient to reduce and maintain the palladium in colloidal form. Other catalytic materials that can be used include metals such as pieces of metallic copper, iron or aluminum, or rejected circuit boards. The amount of catalytic material used is that amount necessary to cause the solution to undergo spontaneous decomposition as can be evidenced by the solution becoming murky and gassing. A disadvantage to this process is that the metal values in solution often solidify as a fine powder that is difficult to separate from the bulk of the solution. Another disadvantage is that on occassion, the metal values precipitate onto the the walls of the reactor containing the spent solution and are difficult to remove therefrom.

Another method for removing metal values from spent solution comprises electroplating. Electroplating procedures are well known in the art. The residual metal values plate-out onto a suitable electrode upon passage of a current through the solution. This method is expensive and requires electroplating equipment. The method is also not fully adequate because it is difficult to decrease the dissolved metal content to an acceptable level—i.e., below several hundred parts per million parts of solution.

Other physical methods are known such as dialysis and ion exchange, but these methods are more exotic and require expensive evaporators and dialysis equipment. Other chemical methods are known for removal of dissolved metal such as precipitation with a material such as ferrous sulfite, but such methods typically result in sludge formation which, in itself, is difficult to dump and also leaves a large concentration of dissolved metal in solution.

A preferred method for removing dissolved metal values from solution, in accordance with this invention, is illustrated in steps one to four of FIG. 1. The method comprises contact of the spent solution with a material referred to herein as a "seeder". A seeder is prepared by soaking a particulate, porous material of high surface area, e.g., a filter aid material (inclusive of granulated carbon), in a solution of a material catalytic to the deposition of the dissolved metal. Palladium is the preferred catalytic material but other precious metals such as gold, silver and other noble metals may be used as well as other metals known to be catalytic to electroless metal deposition. One method of preparing the seeder is by soaking the particulate material in a spent solution of the catalyst used in the plating line to render surfaces to be plated catalytic to the deposition of electroless metal though this method is lesser preferred because reproducible results are not always obtained with this procedure. A spent solution of CATALYST 6F, as described above, is suitable. The catalytic material is absorbed into the pores of the particulate material making the particulate material catalytic to the deposition of the electroless metal in the plating solution. Variables such as contact time of the particulate material with the catalyst solution is dependent upon the concentration of the catalytic material in solution and the porosity and surface area of the particulate material. Typically, the particulate material should be in contact with the catalytic material for at least five minutes, and preferably, in excess of ten minutes.

For more reproducible results, a fresh solution of palladium catalyst such as CATALYST 6F is preferred, preferably diluted to less than twenty percent strength of its normal strength and more preferably diluted to less than 100 parts palladium per million parts of solution. The dilution is desirable to avoid triggering of the solution when adding seeder to the solution to be treated.

For a seeder product that is not to be used immediately, to prolong shelf life of the seeder, particularly over carbon, it is desirable to coat at least a portion of the surface of the catalyzed particulate material with a very thin layer of metal such as nickel or copper. The seeder desirably has at least fifty percent of its surface coated with metal, most preferably over 90 percent of its surface so coated. It should be noted that the metal selected for coating the seeder should be autocatalytic to the dissolved metal in the solution. Therefore, a nickel coating would probably not be useful for waste treating a copper plating solution. Instead, the coating metal for such an application is desirably copper.

Most filter aids are suitable particulate materials for the preparation of seeder. Diatomaceous earth is the most commonly used filter aid. Other filter aids comprise activated carbons, talc, alumina, oxides of the transition metals, various clays, etc., all of which are well known in the art. Granular materials as opposed to fine particulates are preferred to avoid triggering or foaming of the solutions waste treated with the seeder. In this respect, it is preferred that the bulk of the filter aid is retained by a 200 mesh Tyler seive and more preferably, by a 100 mesh Tyler seive.

For the specific contemplated use of this invention, granular carbon treated with a palladium catalyst and coated over at least about 80 percent of its surface with a thin layer of copper constitutes a preferred seeder. The carbon is of extremely high surface area and of a specific gravity such that, when mixed with the spent plating solution, it is maintained suspended with agitation, yet it is readily filtered from solution when desired. Also, the metal removed from solution is easily recovered by burning the carbon off as carbon dioxide leaving pure metal behind for recovery.

For the seeder to remove sufficient dissolved metal to meet regulations relating to discharge to the environment, the spent solution must function as an electroless plating solution. Therefore, it is frequently necessary to add reducing agent and pH adjustor to the spent solution. In addition, the spent solution cannot contain ingredients antagonistic to the plating solution such as cyanides or other materials which in sufficient quantity, will poison the plating solution. Preferably, the reducing agent is added in stoichiometric excess of the dissolved metal contained in solution and more preferably, is always in excess of 2 grams per liter of solution. Also, the seeder is used under conditions normally used for the plating solution from which the spent solution is derived. For example, a solution that is normally heated should be heated for plate-out onto seeder. If the metal to be removed is copper from an alkaline copper plating solution, formaldehyde is conveniently used as the reducing agent and the solution is preferably adjusted to pH above 10 by addition of sodium hydroxide.

When using seeder to remove metal values from a spent plating solution, case should be exercised to avoid spontaneous decomposition of the solution. Otherwise, as explained above, metal fines can be formed which are difficult to separate from solution. Spontaneous decomposition is avoided by solution agitation to avoid localized areas of high seeder concentration.

As above, the seeder is preferably added to the spent solution with agitation so that the seeder is dispersed throughout the solution. This provides for the greatest contact between seeder and solution and reduces the likelihood of spontaneous decomposition. Since the seeder is catalytic to metal deposition and has substantial surface area, metal will plate-out on the surface of the seeder. Under the conditions described herein, the overall reaction is quite efficient, the process being capable of decreasing the dissolved metal content of the spent solution to less than ten parts per million parts of solution and frequently to less than one part per million parts.

The contact time of the seeder with the spent solution is dependent upon several variables which should be obvious to those skilled in the art such as solution temperature, pH and the concentration of the reducing agent. The object of seeder treatment is to remove dissolved metal from the spent solution and therefore, contact time between the seeder and the spent solution should be for a time sufficient to reduce the metal content of the spent solution to acceptable levels for dumping, typically to a concentration of less than ten parts per million parts of solution and preferably, to less than one part per million parts. This can take from 10 minutes to in excess of 3 hours. The seeder can be reused for further treatment. Generally, it can be used until its weight is at least doubled by metal plate-out over its surface.

It is believed that the metal coated seeder and the use of the same in a spent plating solution that has been adjusted to make the same a functionally operative plating solution is novel.

Following contact of the seeder with the spent solution, the solution is passed to means to physically separate the seeder from the spent plating solution. At this point in the process, the seeder has metal plated from the plating solution over its surface. Filtration such as a bag filter, comprises a simple and convenient separation means. A preferred method, especially for use in a continuous process, uses a series of overflow separation tanks which combines the steps of contact with seeder and physical separation into a single step. Alternatively, the agitators can be stopped permitting the seeder to settle. The solution may then be separated from the seeder such as by decantation.

Following removal of the metal values from the spent solution, the solution has a metal content reduced to acceptable levels for discharge directly to the environment, but also contains active complexing agents that are capable of complexing with heavy metals at the pH permitted for discharge to the environment—i.e., usually between pH 6.5 and 9.5. As a consequence of the active complexing agents, the metal content might be increased to unacceptable levels by contact of the spent solution with residues contained in the pipes through which the solution passes during pumping to the discharge point or at any other point in the waste treatment process, or from a settling pond.

Because the complexing agent is active at this point in the process, the next step comprises inactivation or destruction of the complexing agent's ability to complex with heavy metals. The preferred method in accordance with the invention is illustrated as the fifth through seventh steps of FIG. 1. This method comprises contact with a halogen, preferably a source of chlorine. The destruction of ammonia by break-point halation in municipal waste waters is a known process disclosed in U.S. Pat. Nos. 3,732,164, 3,733,266 and 4,137,160, all incorporated herein by reference. As disclosed in said patents, it is known that contact of chlorine or preferably sodium hypochlorite with a waste stream containing ammonia in amounts of from 15–20 milligrams per liter, under conditions as set forth in the patents, results in oxidation of the ammonia with the liberation of nitrogen as a gas and the formation of hydrochloric acid.

For reasons not fully understood, it is one discovery of this invention that contact with a halogen can be used to inactivate those complexing agents typically used in metal plating solutions. What is surprising and unexpected about this discovery is that the process is useful for complexing agents that are amines inclusive of primary, secondary and tertiary amines as well as other complexing agents typically used in metal plating, whether or not they are amines—e.g., carboxylic acids and amino acids may be inactivated by chlorination. Another surprising discovery of this invention is that the procedure can be used for solutions containing relatively high concentrations of complexing agent compared to the concentration of ammonia found in municipal and industrial waste waters. Hence, where in the treatment of ammonia in municipal waste waters, the process is used to destroy ammonia in amount of less than 20 milligrams per liter, in accordance with the present invention, complexing agents in amounts in excess of 10 grams per liter can be treated.

The term "inactivate" has been used to describe the effect of contacting the complexing agent with halogen. This term is used because it is believed that the ability to complex may not be destroyed by contact with the chlorine as in the case of ammonia. This belief is based upon the observation that following chlorination, the solution is unable to complex with metal ions. However, if the solution is contacted with sodium bisulfite following chlorination, there appears to be a formation of a complexing species, which may or may not be the same species as originally present, as evidenced by the ability of the solution to again complex metals—e.g., copper.

The preferred halogen for inactivating the complexing agent is chlorine and the most expeditious method of adding the chlorine is in the form of an alkali or an alkaline earth metal hypochlorite, most preferably in the form of an aqueous solution of sodium hypochlorite.

The first step in inactivation of the complexing agent is dilution. The reaction is exothermic and more readily controlled when the concentration of the complexing agent is reduced. Therefore, the solution is diluted so that the concentration of the complexing agent in solution is reduced to preferably less than fifty percent of what it would be in a freshly made up plating solution. Preferably, the concentration of the complexing agent varies between about 0.1 and 20 grams per liter and more preferably, between about 0.5 and 10 grams per liter of plating solution.

Following dilution, pH adjustment may be necessary. The inactivation of the complexing agent is not particularly pH dependent and can be accomplished over a wide range of pH. In this respect, pH can vary between about 2.0 and 12.5. However, it is known that an explosive gas mixture can be formed by acid contact of ammonia with a hypochlorite. Moreover, regulations require discharge of waste solutions within a pH range of from 6.5 to 9.0. Accordingly, a preferred pH range is from 7 to 10, and the most preferred range is between about 9 and 10, it being understood that the pH drifts lower as the reaction proceeds.

The concentration of the halogen used is that amount necessary to inactivate substantially all of the complexing agent. Preferably, the concentration of the halogen is in molar excess of the concentration of the complexing agent, preferably, from 1 to 25 moles of halogen are used per mole of complexing agent and more preferably, from about 5 to 20 moles per mole of complexing agent.

Contact time of the halogen with the spent solution is that time necessary to inactivate the complexing agent. The reaction is not instantaneous and generally, in excess of 10 minutes contact time is required. Preferably, the contact time is at least 1 hour and frequently, from 2 to 4 hours are required, though the reaction is temperature dependent and elevated temperatures reduce the contact time.

Other conditions governing the inactivation step are not critical. The temperature is preferably room temperature but this is not mandatory and if the solution temperature is above room temperature as a consequence of an exotherm, this does not deleteriously effect the reaction. Preferably, agitation is used during contact of the halogen with the spent solution.

Following inactivation of the complexing agent in the spent solution, the pH of the solution may require adjustment to an acceptable level for discharge to the environment. Current regulations permit discharge within a pH range of from 6.5 to 9.5. Therefore, if the inactivation step is performed within the preferred range of pH, the solution may be discharged without further pH adjustment.

Figure 2:
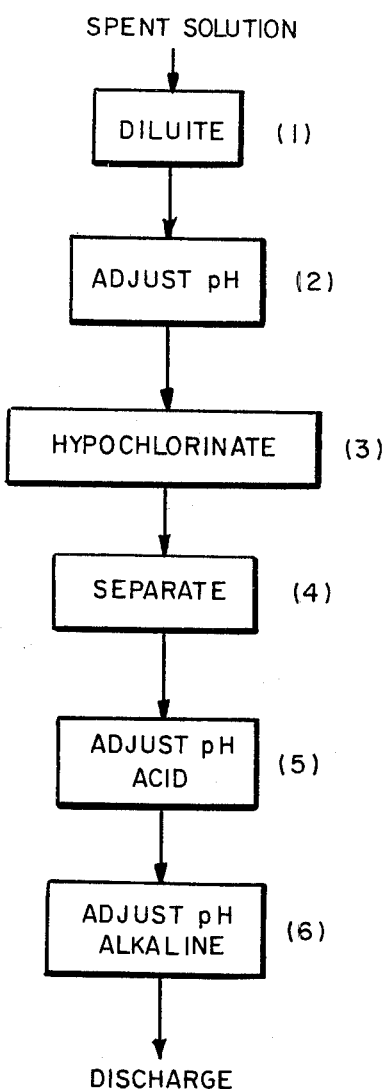
FIG. 2 represents a flow chart of a lesser preferred method for performing the process of the subject invention.

An alternative to the procedure set forth above is illustrated in FIG. 2 of the drawings, though this is a lesser preferred embodiment of the invention. The procedure in FIG. 2 differs from that illustrated in FIG. 1 by elimination of the steps relating to removal of metal values prior to inactivation of the complexing agent. In accordance with this procedure, the complexing agent is inactivated in the same manner as described above.

The inactivation of the complexing agent in some solutions can cause insolubilization of the metal values which settle to the bottom of the reactor as a wet sludge. This is particularly true with baths utilizing cyanide as a complexing agent. For most solutions treated in accordance with this invention, insolubilization is accomplished by pH adjustment. To accomplish insolubilization, it has been found necessary to drop the pH to the acid side, such as between about 2 and 4 and then readjust the pH to the alkaline side, preferably within a range whereby discharge is permitted—e.g., to a pH between 7 and 9. At the alkaline pH, most common plating metals insolubilize and settle to the bottom of the tank as a sludge which is readily separated by known separation methods.

By performing the above process in overflow settling tanks or by using other physical separation means such as filtration, the metal values are separated from the solution and the spent solution may be discharged to the environment. The disadvantages to this procedure are that the dissolved metal content in the threaded solution are higher than that remaining in the solution treated in accordance with the preferred procedure—i.e., usually about 50 ppm of solution. Also, sludge is an undesirable by-product because it's disposal is also a problem.

The following examples will better illustrate the process of this invention.

EXAMPLE 4

This example illustrates the preparation of seeder that will be used for the treatment of spent solutions in subsequent examples.

The seeder substrate used in this example is an acid washed particulate, granular carbon sold under the tradename Calgon Filtrasorb 400.

The first step in the preparation of seeder is to wash 357 grams of the carbon with water to remove dust. The washed carbon is mixed with a palladium catalyst sold under the tradename CATALYST 9F which catalyst has been diluted with hydrochloric acid and an acidic solution of stannous tin to about 0.02 percent of its packaged strength so that its palladium content is about 0.0004 grams per liter. The carbon is held in the catalyst solution with agitation for about 10 minutes after which time it is removed by filtration. The carbon is then rinsed with water and then mixed with a five percent solution of sodium hydroxide for about 10 minutes. Thereafter, following several water rinses, the catalyzed carbon is mixed with agitation with an electroless copper plating solution sold under the tradename CP-74 which solution is used at about double its normal strength so that the copper content, as metal, is about 7 grams per liter. The catalyzed carbon is kept suspended in solution by mild agitation for about 15 minutes, rinsed and then removed from about ⅔ of the liquid by filtration. This treatment produces a thin coating of copper over the catalyzed carbon. The carbon is now ready for treatment of spent solution.

In place of the copper coating over the catalyzed carbon as set forth above, any of a variety of metals could be used, one illustrative example being an electroless nickel such as that nickel solution sold under the tradename NIPOSIT 65, it being understood that when nickel is used to plate the seeder, the seeder would probably not be suitable for treatment of a spent copper solution, but would be useful for treatment of a spent nickel solution.

EXAMPLE 5

This example represents treatment procedure for a spent copper plating solution. The solution treated in a used solution sold under the tradename CP-74. The formulation of the used solution, prior to treatment, is as follows:

| | |
|---|---|
| Copper (as cupric sulfate pentahydrate) | 7 grams per liter |
| Tartaric acid | 1 gram per liter |
| Pentahydroxypropyl diethylene triamine | 15 grams per liter |
| Formaldehyde | 3 grams per liter |
| Sodium Hydroxide | 10 grams per liter |
| Water | to one liter |

The solution also contains minor quantities of other proprietary additives, but these are not believed to be relevant to the process discosed herein because they are present in minute quantities and they are not involved in the waste treatment procedure described herein.

The above formulation requires both pH adjustment and addition of reducing agent because the concentration of each ingredient is insufficient for the formulation to adequately function as a plating solution. Accordingly, 4 grams of formaldehyde and 10 grams of sodium hydroxide are mixed into the above formulation. The temperature of the solution is increased slightly to about 90° F. as this is the recommended temperature for use of a CP-74 plating solution.

The seeder prepared in accordance with the procedure of Example 4 is added to the spent plating solution with mild agitation. Approximately 36 grams of seeder are added per liter of plating solution. The contact time of the seeder with the plating solution is that time necessary to plate all of the copper out of the solution. This takes about 3 hours but the plate-out is temperature dependent and shorter or longer times may be encountered at different temperature levels. The effluent solution is then separated from the seeder by decantation. The metal content of the so-treated solution is less than five parts per million parts of solution and within acceptable regulation limits.

A 15 weight percent solution of sodium hypochlorite is prepared and 75 milliliters of this solution is added to the spent plating solution diluted with 10 parts water per part of plating solution. Agitation is used for the addition. The pH of the spent plating solution is then adjusted to about 9 by the addition of sulfuric acid. An elevated temperature is not necessary for the step of hypochlorination and the hypochlorination procedure can go forward without either heating or cooling the solution. The solution is permitted to stand at room temperature for up to 3 hours and then a small test sample of the solution is taken.

The pH of the test solution is dropped to about 3 by the addition of sulfuric acid. Copper sulfate pentahydrate is dissolved in the test solution until the solution is saturated and no longer capable of dissolving additional copper sulfate. The pH of the solution is then increased to about 10 by the addition of sodium hydroxide. Increasing the pH of the solution to the alkaline side-results in insolubilization of copper not complexed with complexing agent. Consequently, increasing the pH results in the formation of insoluble copper hydroxide and copper remaining in solution is complexed with complexing agent. Consequently, the copper concentration following the increase in the pH is a measure of the concentration of the complexing agent.

The insolubilized copper hydroxide is removed and an analysis performed for copper. It is found that the dissolved copper concentration in solution is about 25 parts per million parts of solution, thus, indicating that most of the complexing agent has been inactivated by treatment with the hypochlorite solution. If the hypochlorination step had not been performed, the dissolved copper content would have been in excess of about 500 parts per million.

Following the hypochlorination step, if the pH of the solution is not between 7 and 9, it is adjusted to within this range by the addition of sulfuric acid. At this point in the process, the spent solution may be discharged directly to the environment.

EXAMPLE 6

The procedure set forth in Example 5 is preferred in accordance with this invention. The most preferred embodiment of this procedure utilizes the process of Example 5 in a continuous sequence. Such a process, utilizing the solutions and materials of Example 5, is as follows.

The spent plating solution is pumped to the first of a series of tanks. Though not within the context of this example, rinse waters and growth solutions can also be pumped to the same holding tank. Sodium hydroxide and formaldehyde solution are metered into the tank to adjust the formaldehyde content to about 7 grams per liter and the pH of the solution to 12. The solution is continuously pumped through a series of three equal volume overflow tanks, each having a capacity of five liters, at a flow rate such that the dwell time in the series of tanks totals 3 hours. Each tank contains 100 grams of the seeder of Example 4 and each is agitated to disperse the seeder through the spent solution. The solution leaving the last tank may be filtered to remove any granular material. The solution is then diluted and pumped to a second series of three five liter tanks to which a fifteen percent aqueous solution of sodium hypochlorite is added in an amount of 70 ml per liter of solution treated. The rate of flow is adjusted so that the dwell time in the series of tanks is 3 hours. Following this treatment, the solution may be discharged directly to the environment.

EXAMPLE 7

The process of Example 5 was repeated, but the pH used for hypochlorination was varied to determine the effect of pH on inactivation of the complex. The pH used and the results obtained are set forth in the following table where the results are given in terms of complexed copper—i.e., copper complexed by complexing agent and therefore, not inactivated:

| pH | ppm copper |
|----|------------|
| 6  | 23         |
| 7  | 30         |
| 8  | 41         |
| 9  | 25         |
| 10 | 100        |
| 11 | 58         |
| 12 | 82         |

The residual chlorine at pH 11 and 12 was high and hydrogen peroxide was added to inactivate the chlorine. The hydrogen peroxide partly precipitated the copper and consequently, the results given at these two pH levels may be inaccurate.

EXAMPLE 8

The procedure of Example 5 was repeated, but the hypochlorination step was repeated varying the concentration of hypochlorite to determine the effect of chlorine content on inactivation of complexing agent. The results are set forth below:

| Volume (ml/l) | ppm Copper |
|---------------|------------|
| 10            | 191        |
| 20            | 170        |
| 30            | 110        |
| 40            | 61         |
| 50            | 87         |
| 60            | 88         |
| 70            | 35         |
| 80            | 25         |
| 90            | 27         |
| 100           | 28         |

The results reported above are not easily reproducible. A repeat of several of these experiments shows slightly higher copper content. For example, at 10 ml per liter of sodium hypochlorite, 326 ppm of copper were found and at 30 ml per liter of sodium hypochlorite, 123 ppm of copper were found.

EXAMPLE 9

The procedure of Example 5 was repeated, but the use of seeder was omitted. Following hypochlorination, the copper was insolubilized by addition of sulfuric acid to bring the pH to 3 and sodium hydroxide to bring the pH to 9. A sludge formed on the bottom of the reactor. After the sludge settled to the bottom of the reactor, the solution could be separated by decantation.

EXAMPLE 10

The procedure of Example 5 can be repeated for plating solution free of amine complexing agents. For example, the following solution can be waste treated using the procedure of Example 5.

| Copper sulfate pentahydrate | 12 grams |
|-----------------------------|----------|
| Formaldehyde                | 6 grams  |

-continued

| | |
|---|---|
| Sodium hydroxide | 13 grams |
| Rochelle salts | 35 grams |
| Water | To one liter |

For this formulation, the pH would be adjusted to about 10.5 and about 8 grams of formaldehyde would be added. Seeder, as used in Example 5 in about the same quantities would be used though a temperature of about 120° F. would be the preferred treatment temperature. All other process steps would be substantially the same.

EXAMPLE 11

The procedure of Example 5 can be repeated for an electroless nickel plating solution having a formulation as follows.

| | |
|---|---|
| Nickel sulfate hexahydrate | 12 grams |
| Sodium hypophosphite monohydrate | 15 grams |
| Hydroxyacetic acid | 24 grams |
| Ammonium hydroxide | to pH 4.5 |
| Water | to one liter |

Neither reducing agent nor hydroxide need be added to the formulation which is an active plating solution. The seeder used should be free of metal coating or preferably nickel coated. About 40 grams of seeder would be used per liter of solution and the plating temperature would preferably be adjusted to about 180° F.

Following the use of seeder, the solution is diluted and the pH of the solution is increased to about 9 by addition of sulfuric acid. The hypochlorination procedure of Example 5 is then employed.

We claim:

1. A process for the waste treatment of a spent metal plating solution containing dissolved metal from the group of copper and nickel that plates over a catalytic surface in the presence of a reducing agent, a complexing agent for said dissolved metal, and a reducing agent for said dissolved metal, said process comprising the steps of, in either order, removing said dissolved metal from solution and inactivating said complexing agent in solution prior to discharge, said dissolved metal being removed by adjusting the pH of the solution and the concentration of reducing agent in the solution to render said plating solution a plating solution capable of plating substantially all of said dissolved metal onto a catalytic surface, contacting said solution with a particulate metal of large surface area, said particulate metal having absorbed thereon a metal catalytic to the deposition of the dissolved metal in solution and overcoated with a thin layer of a metal autocatalytic to said dissolved metal and maintaining the particulate material in contact with the solution for a time sufficient to deposit substantially all of said dissolved metal on said particulate material, said complexing agent being inactivated by contacting the same with a source of halogen for a time sufficient to inactivate said complexing agent.

2. The process of claim 1 including the step of inactivating the complexing agent in said solution subsequent to the step of depositing dissolved metal.

3. The process of claim 2 where the pH of the solution is adjusted to between 8 and 12 prior to contact with the particulate material.

4. The process of claim 2 where the particulate material is a filter aid having palladium absorbed on its surface.

5. The process of claim 4 where the palladium is deposited from a colloidal solution.

6. The process of claim 5 where the particulate material is granulated carbon having palladium absorbed on its surface.

7. The process of claim 6 where the particulate material has a thin coating of metal on its surface selected from the group of copper and nickel.

8. The process of claim 7 where the metal coating is copper and the metal dissolved in solution is copper.

9. The process of claim 1 where the complexing agent is selected from the group of amines, carboxylic acids and amino carboxylic acids.

10. The process of claim 9 where the halogen is chlorine.

11. The process of claim 9 where the source of halogen is a hypochlorite.

12. The process of claim 9 where the source of halogen is an alkali or alkaline earth metal hypochlorite.

13. The process of claim 9 where the pH of the solution is adjusted to between 7 and 10 for contact of said solution with the source of halogen.

14. The process for the waste treatment of a spent electroless copper plating solution containing dissolved copper and complexing agent selected from the group of amines, carboxylic acids and amino carboxylic acids, said process comprising the steps of adjusting the pH of the solution to between 8 and 12, adjusting the concentration of a formaldehyde reducing agent in the solution to render said spent plating solution in a plating solution capable of plating substantially all of said dissolved copper over a catalytic surface, contacting said solution with a particulate material of large surface area having colloidal palladium absorbed thereon and over coated with a thin layer of copper, maintaining the particulate material in contact with the solution for a time sufficient to deposit substantially all of said dissolved copper onto said particulate material and inactivating the complexing agent in solution subsequent to the step of depositing dissolved metal by contacting said solution with a source of chlorine for a time sufficient to inactivate said agent.

* * * * *